(12) United States Patent
Wang et al.

(10) Patent No.: US 8,718,831 B2
(45) Date of Patent: May 6, 2014

(54) METHODS AND APPARATUS FOR SENSING PARAMETERS OF ROTATING BLADES

(75) Inventors: Dong Wang, Shanghai (CN); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 676 days.

(21) Appl. No.: 12/118,208

(22) Filed: May 9, 2008

(65) Prior Publication Data

US 2009/0277266 A1 Nov. 12, 2009

(51) Int. Cl.
*F03D 7/00* (2006.01)
*F03D 11/00* (2006.01)

(52) U.S. Cl.
USPC ............................ 700/287; 416/61; 290/44

(58) Field of Classification Search
USPC ............... 700/287, 292; 73/514.01, 147, 660; 416/1, 31, 35–37, 61; 415/1, 14, 17; 290/44
See application file for complete search history.

(56) References Cited

U.S. PATENT DOCUMENTS

| | | | |
|---|---|---|---|
| H2057 H * | 1/2003 | Veers et al. | 416/230 |
| 6,940,186 B2 | 9/2005 | Weitkamp | |
| 7,059,822 B2 | 6/2006 | LeMieux et al. | |
| 7,121,795 B2 | 10/2006 | Moroz et al. | |
| 7,246,991 B2 | 7/2007 | Bosche | |
| 7,400,054 B2 * | 7/2008 | Wesselink | 290/44 |
| 7,883,319 B2 * | 2/2011 | Volkmer | 416/61 |
| 2005/0276696 A1 * | 12/2005 | LeMieux | 416/61 |
| 2007/0108770 A1 * | 5/2007 | Riesberg | 290/44 |
| 2007/0159346 A1 | 7/2007 | Wesselink | |
| 2007/0222590 A1 | 9/2007 | Posamentier | |
| 2007/0252691 A1 | 11/2007 | Mirmobin et al. | |
| 2008/0101930 A1 * | 5/2008 | Bosche | 416/31 |
| 2009/0319199 A1 * | 12/2009 | Volkmer | 702/41 |

FOREIGN PATENT DOCUMENTS

| | | |
|---|---|---|
| CN | 101000040 A | 7/2007 |
| DE | 100 65 314 A1 | 7/2002 |
| DE | 10 2006 049 378 A1 | 4/2008 |
| EP | 1 591 049 A1 | 11/2005 |
| EP | 1 770 668 A2 | 4/2007 |
| EP | 1 903 214 A2 | 3/2008 |
| GB | 2 425 691 A | 11/2006 |
| WO | 99/57435 A1 | 11/1999 |
| WO | 2005/068834 A1 | 7/2005 |
| WO | 2007/131489 A1 | 11/2007 |
| WO | 2008/025779 A1 | 3/2008 |

OTHER PUBLICATIONS

Danish Patent and Trademark Office, Search Report for Application No. 2009-00547, Nov. 27, 2009, 1 page.
Search Report issued in connection with CN Application No. 200910138069.X, Jul. 25, 2012.
Yeager et al., 2008 International Conference on RFID, Apr. 16-17, 2008, (Las Vegas), pp. 320-327, Wirelessly-Charged UHF Tags for Sensor Data Collection.
Office action issued in connection with DK Patent Application No. PA 2009 00547, Mar. 7, 2013.
RFID Chip to Monitor Tire Pressure, RFID Journal, Oct. 17, 2002 (http://www.rfidjournal.com/article/view/93/1/1/).

* cited by examiner

*Primary Examiner* — Sean Shechtman
*Assistant Examiner* — Steven Garland
(74) *Attorney, Agent, or Firm* — James McGinness; Armstrong Teasdale LLP

(57) ABSTRACT

A method for monitoring operating parameters of a rotating blade is provided. The blade includes at least one sensor thereon, the sensor operatively coupled to a data acquisition device. The method includes transferring data from the sensor to the data acquisition device, the data relating to blade acceleration measurements, transmitting a signal representative of the transferred data from the data acquisition device to a control system, and controlling blade loads using the transmitted signal.

15 Claims, 8 Drawing Sheets

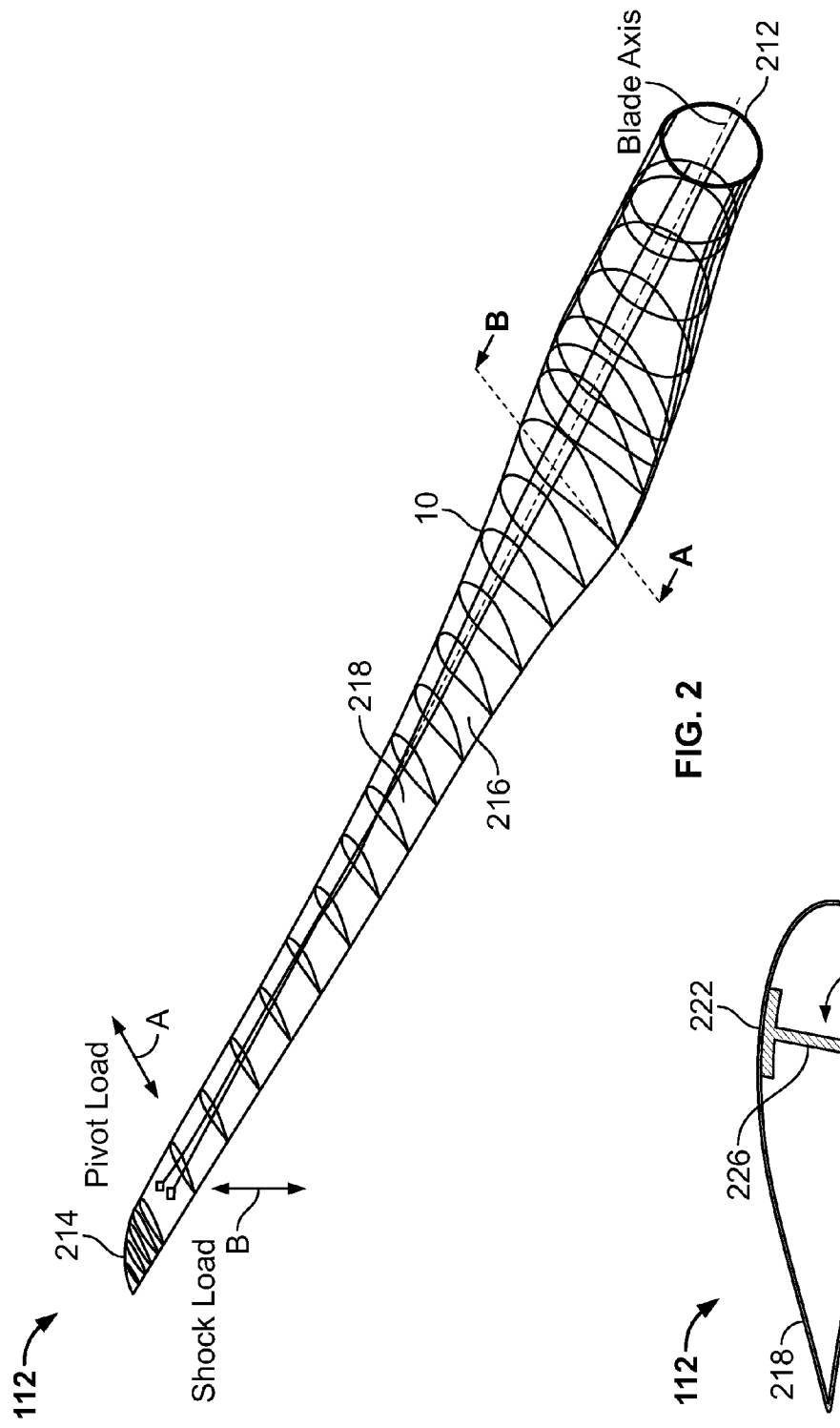
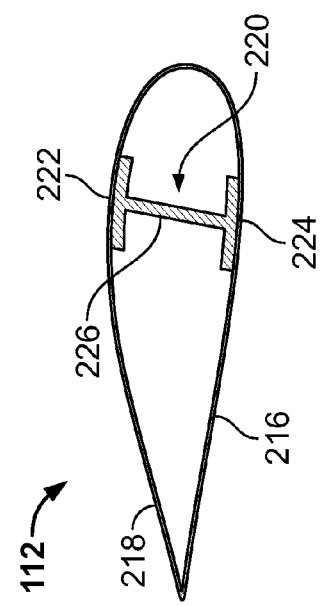
FIG. 2
FIG. 3

METHODS AND APPARATUS FOR SENSING PARAMETERS OF ROTATING BLADES

BACKGROUND OF THE INVENTION

This invention relates generally to the transmission of data and, more specifically, to the transmission of data from a sensor on a rotating blade to a control system.

Wind turbines are increasing in size and capacity to meet increased electrical energy demands. To increase energy output, known rotor blade lengths have been increased, while the weight of known rotor blades has been decreased. As a result of the increased blade lengths and reduced blade weights, rotor blades may be subject to greater deflection forces and, thus, may be at a greater risk of blade stall, mechanical fatigue, and/or blade crash.

Blade stress is a function of temperature and pressure, among other things. A blade crash is a catastrophic failure that can sometimes occur on a wind turbine. A blade subject to blade crash can actually disintegrate and fall from a wind turbine. As such, to increase the awareness of potential blade problems, it is desirable to measure blade parameters while the blade is rotating. For example, known wind turbines include sensors for detecting rotor blade deflection. Such sensors are typically mounted on the rotor blades. A sensor can be wired to a blade, but since the blade is rotating, retrieving data with a wired connection is generally difficult. Communication signals and/or power cables must be provided across a pitch axis of the rotor blades. As such, known wind turbines utilize, for example, slip ring methods to bring the communication or power cables from the rotor blade to the hub. However, such techniques increase assembly and maintenance time, and increase the complexity of collecting real-time data of temperature, strain, and/or pressure.

BRIEF DESCRIPTION OF THE INVENTION

In one aspect, a method for monitoring operating parameters of a rotating blade is provided. The blade includes at least one sensor thereon, the sensor operatively coupled to a data acquisition device. The method includes transferring data from the sensor to the data acquisition device, the data relating to blade acceleration measurements, transmitting a signal representative of the transferred data from the data acquisition device to a control system, and controlling blade loads using the transmitted signal.

In another aspect, a blade configured for mounting to a rotor is provided. The blade includes at least one sensor operatively coupled to a data acquisition device also on the blade. The at least one sensor is configured to transfer blade acceleration data to the data acquisition device. The data acquisition device is configured to generate a signal representative of the data received from the at least one sensor and to transmit the signal to a control system, which is configured to control blade loads using the signal.

In another aspect, a wind turbine is provided. The wind turbine includes at least one blade including at least one sensor operatively coupled to at least one data acquisition device mounted on the blade. The at least one sensor is configured to transfer blade acceleration data to the at least one data acquisition device. The wind turbine also includes at least one real-time or near real-time control system. The data acquisition device is configured to generate a signal representative of the sensor data and to transmit the signal to the at least one control system, which is configured to control blade loads.

BRIEF DESCRIPTION OF THE DRAWINGS

FIG. 2 shows a view of an exemplary wind turbine blade that may be used with the wind turbine shown in FIG. 1;

FIG. 3 is a cross-sectional view of the wind turbine blade shown in FIG. 2;

DETAILED DESCRIPTION OF HE INVENTION

The foregoing description of the present invention will be better understood when read in conjunction with the appended figures. To the extent that the figures illustrate diagrams of the functional blocks of various embodiments, the functional blocks are not necessarily indicative of the division between hardware circuitry. Thus, for example, one or more of the functional blocks (e.g., processors or memory) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and the instrumentality shown in the figures.

As used herein, an element or step recited in the singular and proceeded with the word "a" or "an" should be understood as not excluding a plurality of the element or step, unless such an exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
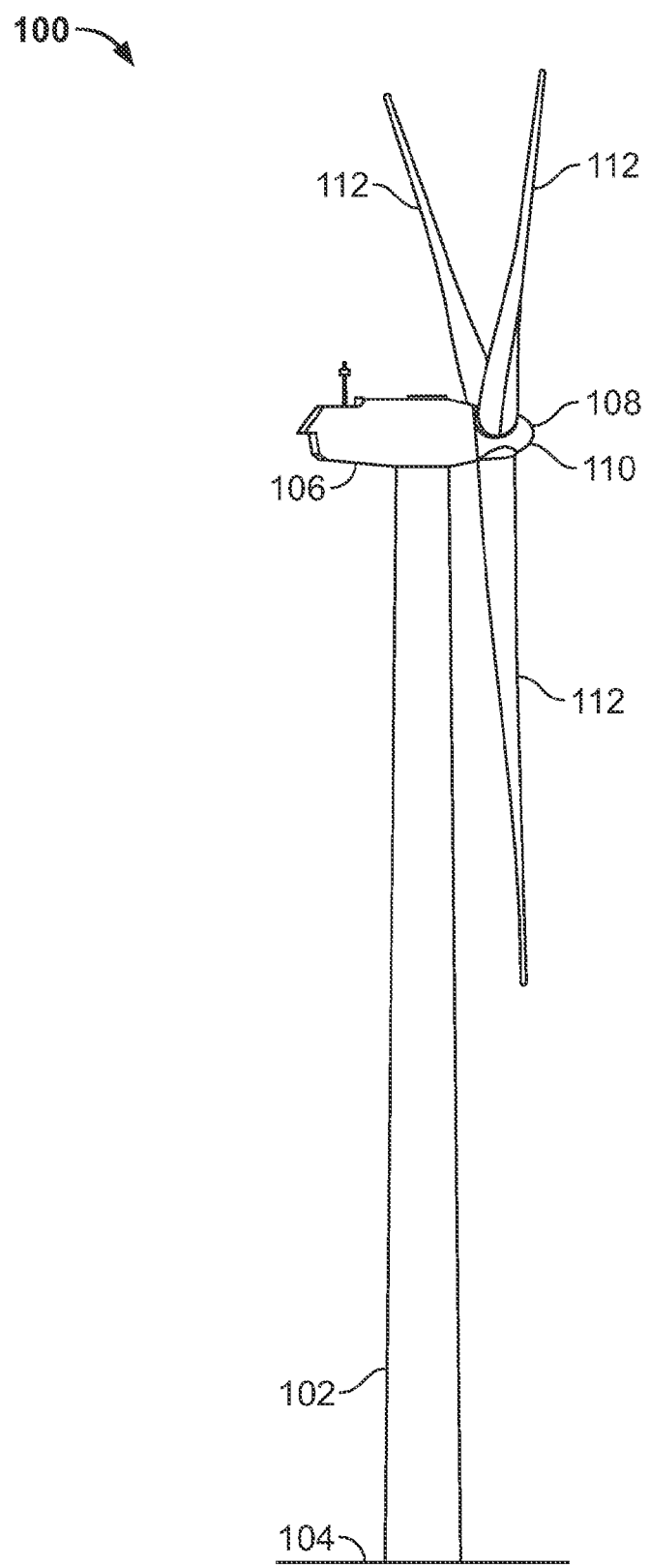
FIG. 1 is a side view of an exemplary wind turbine.

FIG. 1 is a side view of an exemplary wind turbine 100, such as, for example, a horizontal axis wind turbine. Wind turbine 100 includes a tower 102 that extends from a supporting surface 104, a nacelle 106 mounted on tower 102, and a rotor 108 coupled to nacelle 106. Rotor 108 includes a hub 110 and a plurality of rotor blades 112 coupled to hub 110. In the exemplary embodiment, rotor 108 includes three rotor blades 112. In an alternative embodiment, rotor 108 includes more or less than three rotor blades 112. In the exemplary embodiment, tower 102 is fabricated from steel and includes a cavity (not shown) extending between supporting surface 104 and nacelle 106. Alternatively, tower 102 may be, for example, a lattice tower. It is appreciated, however, that the benefits and advantages of the invention may occur in a variety of structures, such as wind turbine 100, that have a rotor, such as rotor 108, and rotor blades, such as rotor blades 112.

As such, while the invention is described and illustrated in the context of wind turbine 100, the invention is not intended to be limited thereto. It is recognized that the invention can be utilized in a variety of systems and for a variety of applications, such as other types of turbines, generators, motors, wings or propellers on airplanes, helicopters, etc.

During operation, blades 112 are positioned about rotor hub 110 to facilitate rotating rotor 108 to transfer kinetic energy from the wind into usable mechanical energy. As wind strikes blades 112, blades 112 are rotated and are subjected to centrifugal forces and to various bending moments. As such, blades 112 deflect and/or rotate from a neutral, or non-deflected, position to a deflected position. Moreover, a pitch angle of blades 112 can be changed by a pitching mechanism (not shown in FIG. 1) that facilitates increasing or decreasing blade 112 speed, and that facilitates reducing tower 102 strike.

FIGS. 2 and 3 illustrate an exemplary blade 112. Blade 112 extends from a blade root 212, adjacent to rotor huh 110 (shown in FIG. 1), in a direction substantially normal to the axis of rotor 108 (shown in FIG. 1) to a blade tip 214. For reinforcing this blade embodiment, a spar 220 is provided (see FIG. 3) which comprises a web 226 and two spar flanges 222 and 224 that extend substantially parallel to peripheries 216 and 218 of rotor blade 112. In the exemplary embodiment, spar 220 has an I-profile. It will be appreciated that embodiments of the present invention are not limited to the particular construction of rotor blade 112 used in the embodiment described herein.

During operation, loads, known as pivot loads, on rotor blade 112 may occur in the plane of the rotor blade 112, as indicated by double arrow A. Furthermore, loads normal to the rotor plane, known as shock loads, may occur as indicated by arrow 13. Temperature differentials may be induced anywhere along rotor blade 112, for example, by ice adhering to, or sloughed off, blade 112.

Figure 4:
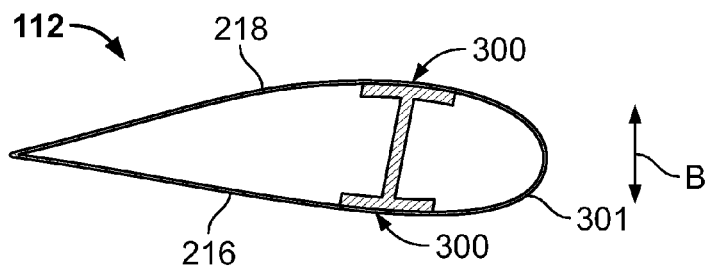
FIGS. 4 through 6 are cross-sectional views of alternative embodiments of the wind turbine blade shown in FIG. 2.
Figure 5:
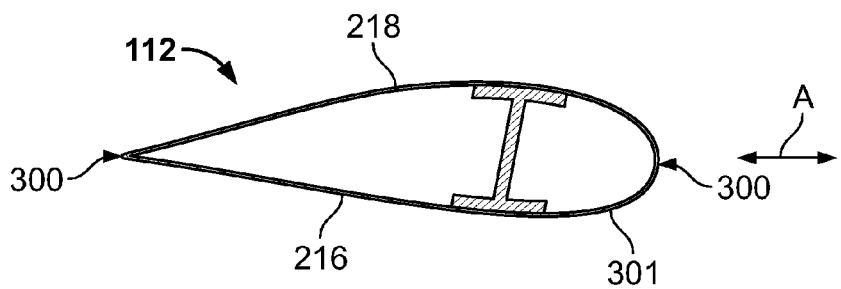
Figure 6:
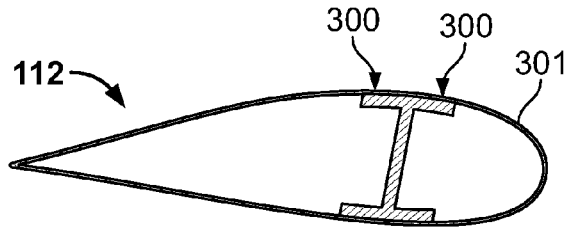
Figure 7:
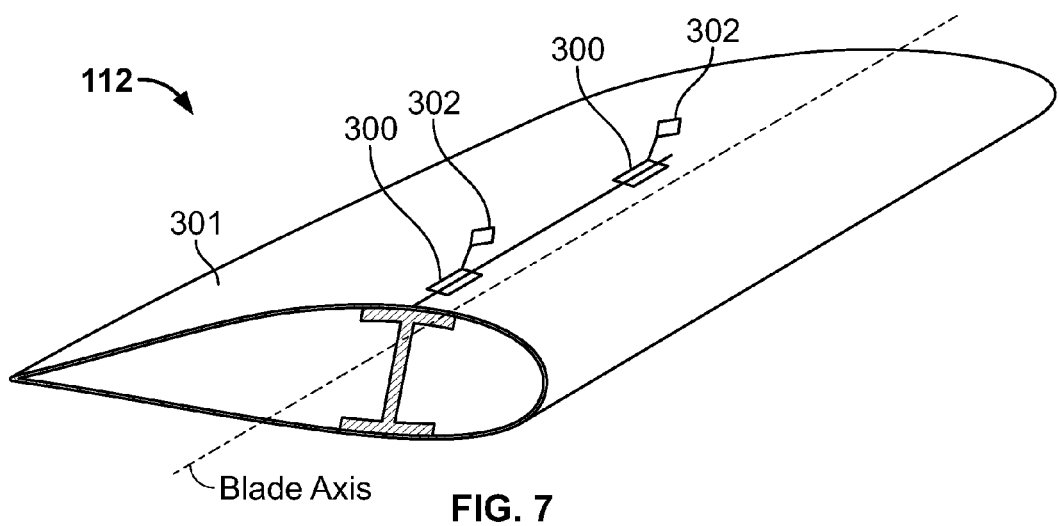
FIG. 7 is a perspective view of a portion of an alternative embodiment of the wind turbine blade shown in FIG. 2.

In the exemplary embodiment, and as shown in FIGS. 4-7, sensor elements 300 are provided on each rotor blade 112. As shown in FIGS. 4, 5, and 6, two sensor elements 300 are provided per blade 114. Specifically, in FIG. 4, sensor elements 300 are coupled on opposite sides 216 and 218 of blade 112, such that shock loads on rotor blade 112 can be accurately sensed. In FIG. 5, pivot loads on rotor blade 112 can be sensed because sensor elements 300 are coupled in the nib and end edge portions of rotor blade 112. In FIG. 6, sensor elements 300 are directly juxtaposed in the region of the spar flange. In FIG. 7, sensor elements 300 are coupled along a line that extends substantially parallel to the longitudinal axis of rotor blade 112. Specifically, spatial separation of sensor elements 300 facilitates reducing the risk of simultaneous damage of both sensor elements 300 by force, lightning, or other destructive forces.

Neither the location of sensor elements 300 on blade 112 nor the number of sensor elements 300 per blade 112 is intended to be limiting. Rather, it is contemplated that in alternative embodiments, rotor blade 112 will include as many sensor elements 300 as is needed, or are desirable to optimize, or at least facilitate detection of, anomalous stress, strain, temperature, and/or other conditions of blades 112.

Moreover, in the exemplary embodiment, and as shown in FIGS. 4-7, each sensor element 300 is operatively coupled, such as electrically coupled, to a data acquisition device 302. Each sensor element 300 transfers sensor data to data acquisition device 302. In an alternative embodiment, data acquisition device 302 polls an associated sensor element 300 for data at predetermined intervals. Each data acquisition device 302 is supplied with energy generated at blade 112. Alternatively, each data acquisition device 302 is supplied with energy generated at hub 110. For example, in one embodiment, energy from blade vibrations is collected and conditioned for use by data acquisition device 302. In an alternative embodiment, energy from delta pressure across each blade 112 is collected and conditioned for use by data acquisition device 302. In another alternative embodiment, energy is collected by solar panels (not shown) and conditioned for use by data acquisition device 302. It will be appreciated that embodiments of the present invention are not limited to the particular method of providing energy to data acquisition device 302 used in the embodiment described herein.

Figure 8:
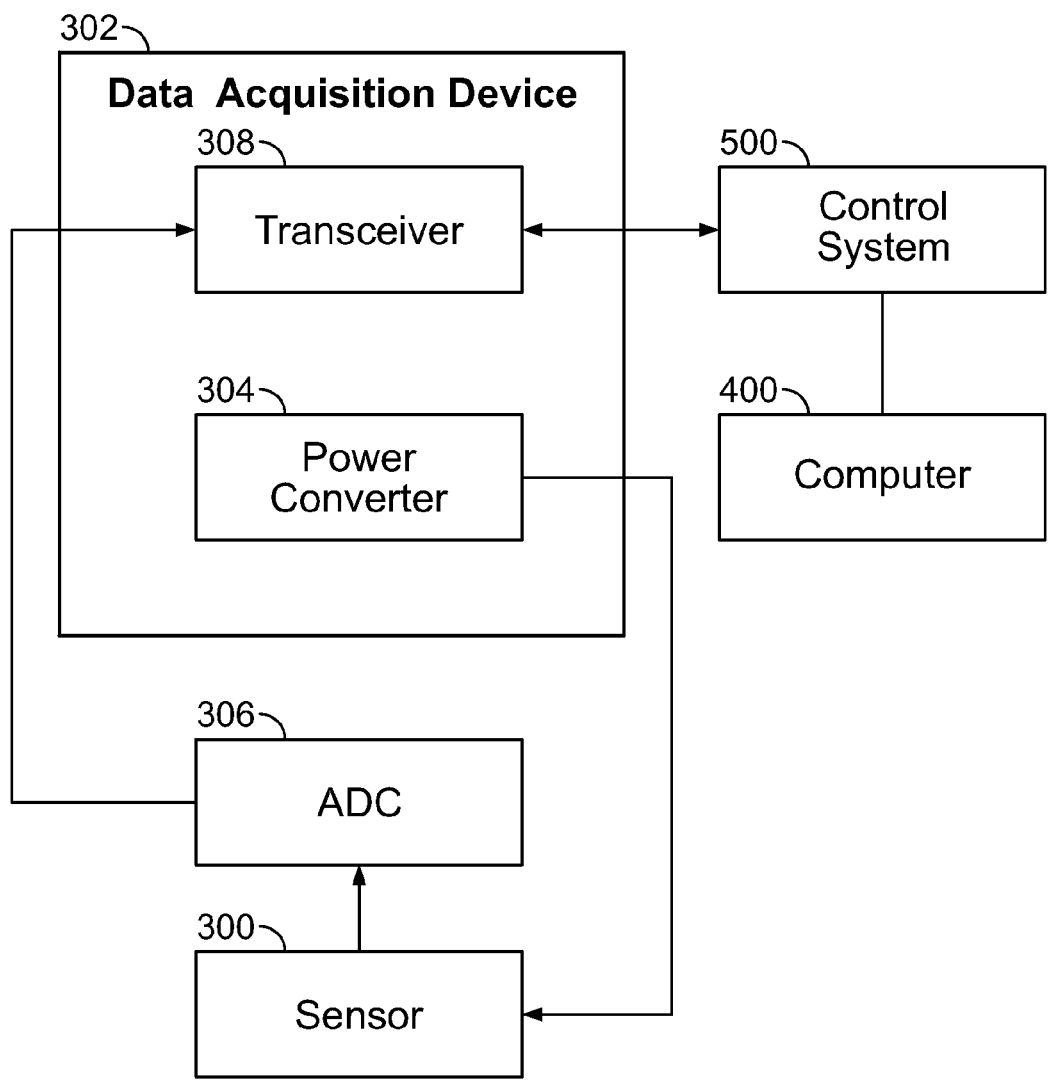
FIG. 8 is a block schematic diagram of an exemplary system for communicating data relating to the wind turbine blade shown in FIG. 2.

Accordingly, as shown in FIG. 8, data acquisition device 302 includes a power converter 304. In the exemplary embodiment, power converter 304 also supplies power to associated sensor element 300. Moreover, in the exemplary embodiment, data acquisition device 302 includes an analog to digital converter (ADC) 306 configured to convert an analog signal produced by sensor element 300 to a digital signal representative of the sensor data. In an alternative embodiment, ADC 306 is separate from data acquisition device 302 and is operatively coupled to sensor element 300 and data acquisition device 302. In the exemplary embodiment, data acquisition device 302 also includes a transceiver 308 that facilitates receiving sensor data from sensor element 300 and/or ADC 306, and transmitting a signal representative of the sensor data to a collection device, such as control system 500, described in more detail below. In an alternative embodiment, data acquisition device 302 includes separate a receiver and transmitter, rather than transceiver 308. In one embodiment, sensor element 300 may comprise one or more radio-frequency identification (RFID) sensor tags to transmit sensor data. Radio-frequency identification (RFID) is an automatic identification method that relies on storing and remotely retrieving data using devices called RFID sensors. RFID sensors coupled to blade 112 may collect blade data, temporarily store the data, and wirelessly transmit the data to data acquisition device 302 and/or an RFID reader (not shown). No internal power source is need for passive RFID tags. As such, passive RFID tags may be formed in small packages. Moreover, a cost of each passive RFID tag is low, whether such a tag is used as a temperature sensor, strain sensor, or a pressure sensor. As such, multiple RFID tags may be installed on each blade 112 to record, store, and transmit the physical conditions and/or operating conditions of each blade 112. An RFID reader may be mobile or may be installed in tower 102.

In the exemplary embodiment, sensor element 300 and data acquisition device 302 are fabricated sufficiently thin to be adhered to a surface 301 (shown in FIGS. 4-7) of blade 112. In an alternative embodiment, sensor element 300 and data acquisition device 302 are covered by a coating sufficiently flat and smooth to facilitate preserving the aerodynamic qualities of blade 112. In another alternative embodiment, sensor element 300 and data acquisition device 302 are unitarily formed into one piece.

During operation, each data acquisition device 302 is powered as described above. Data acquisition device 302, in turn, provides power to one or more associated sensor elements 300. As blade 112 is subjected to stresses and/or loads, each sensor element 300 collects data and transfers the data to the associated data acquisition device 302. Alternatively, each sensor element 300 collects and temporarily stores data. Data acquisition device 302 periodically polls associated sensor element 300 for data. The data is conditioned, such as converted from an analog signal to a digital signal, by ADC 306.

Transceiver 308 then transmits the digital signal, which is representative of the sensor data, to control system 500.

Figure 9:
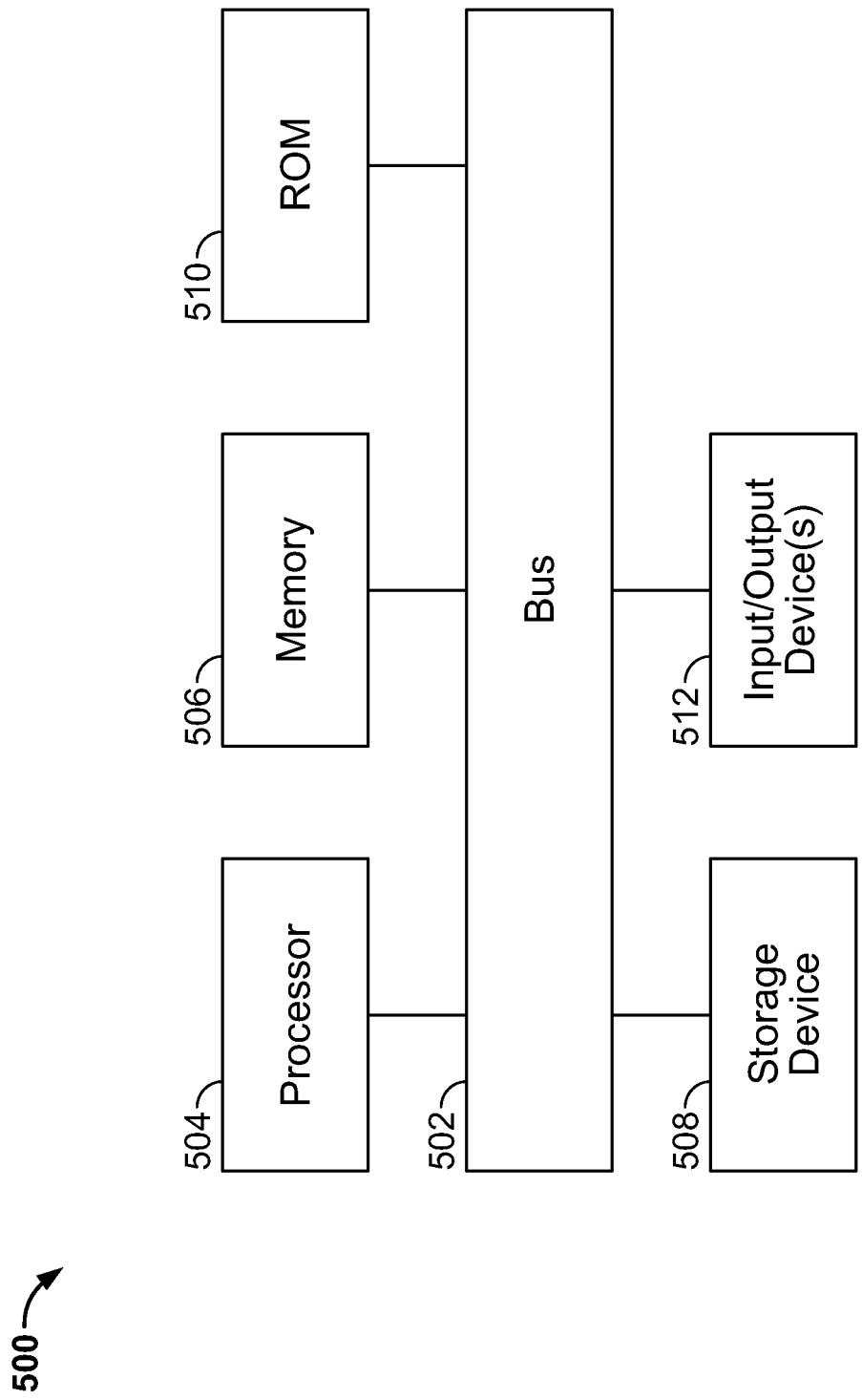
FIG. 9 is a block diagram illustrating a control system that may be used with the wind turbine shown in FIG. 1.

FIG. 9 is a block diagram illustrating an exemplary control system 500 that may be used with wind turbine 100 (shown in FIG. 1). In the exemplary embodiment, control system 500 is located within nacelle 106 (shown in FIG. 1) and includes a bus 502 or other communications device to enable control system 500 to communicate information internally. Control system 500 also includes one or more processors 504 electrically coupled to bus 502. Processors 504 are configured to process information such as, but not limited to, a signal transmitted to control system 500 from data acquisition device 302. Moreover, control system 500 includes a memory 506, such as a random access memory (RAM), a read-only memory 510, and/or one or more storage devices 508. RAM 506, ROM 510, and/or storage device 508 are coupled to bus 502 and configured to store and/or transfer information and instructions to be executed by processor 504. Alternatively, RAM 506, ROM 510, and/or storage device 508 are configured to store temporary variables and/or other information during execution of instructions by processor 504. Control system 500 also includes one or more input/output (I/O) device 512. Such devices 512 may include any device that enables control system 500 to provide output signals to wind turbine 100 to control yaw, pitch, blade temperature, blade braking, and/or any other signals in order to ameliorate anomalous conditions on blades 112. Further, control system 500 outputs signals to one or more computers 400 (shown in FIG. 8) for controlling multiple wind turbines 100.

Figure 10:
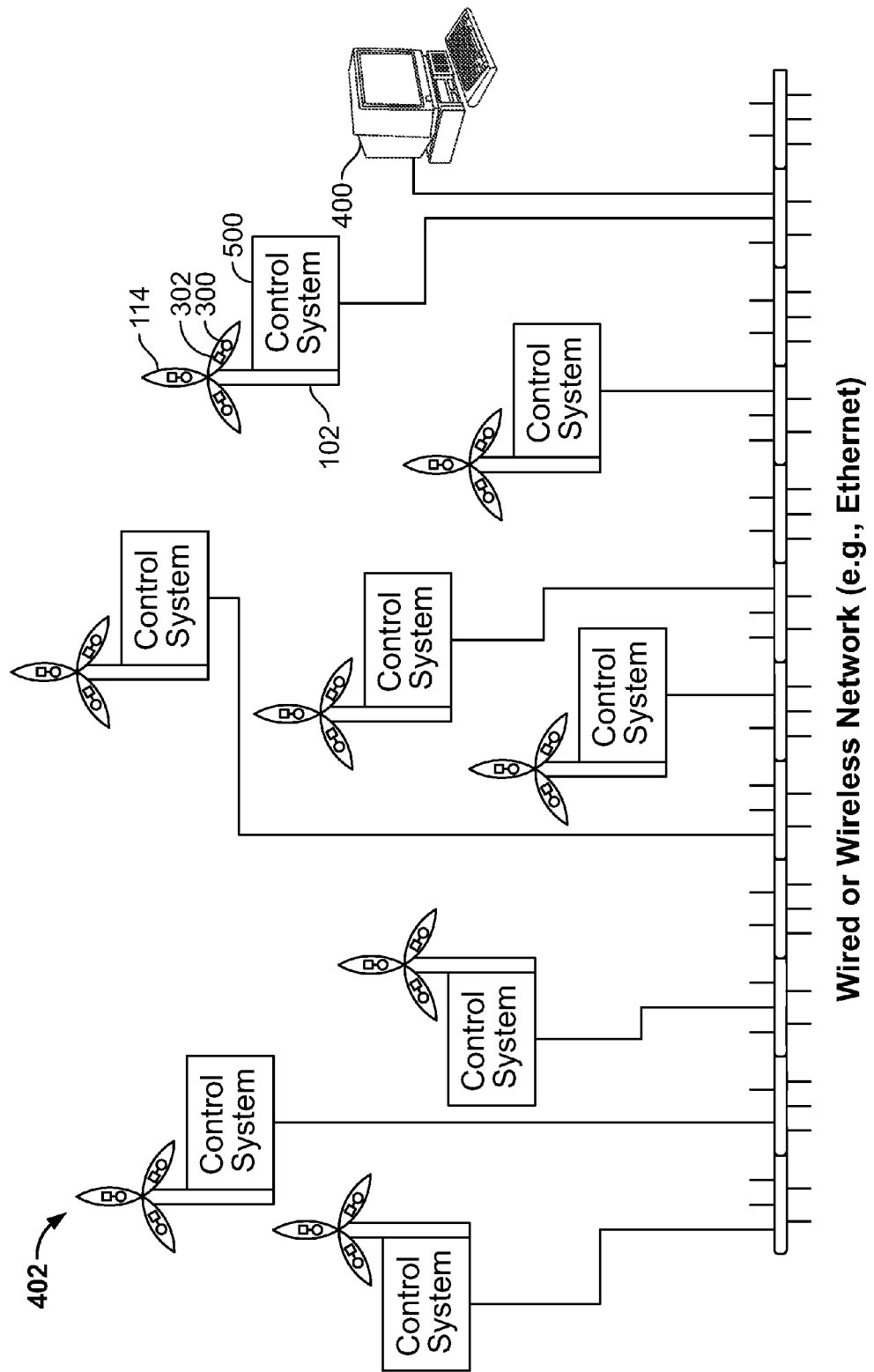
FIG. 10 is a pictorial schematic diagram of an exemplary wind turbine farm.
Figure 11:
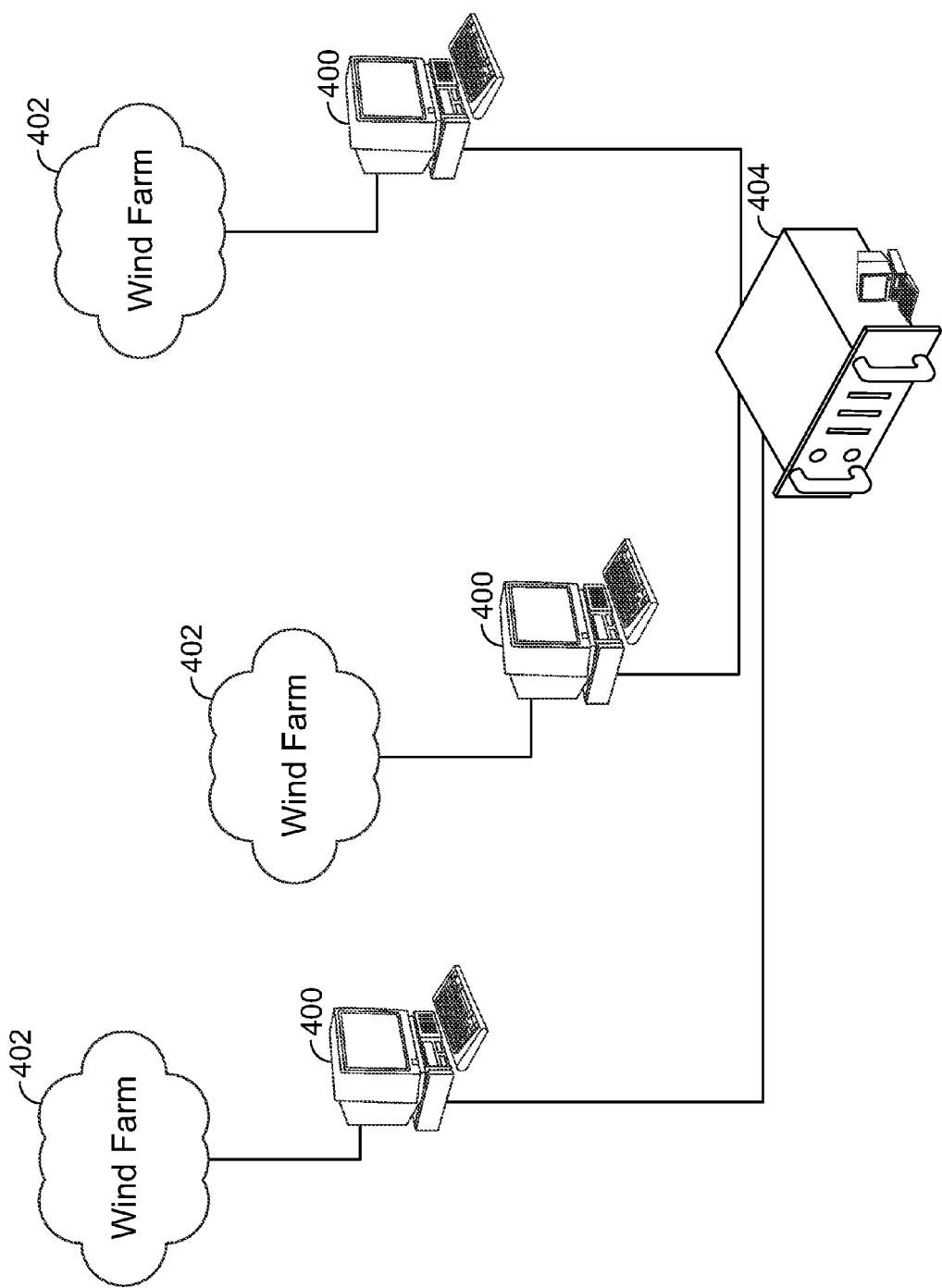
FIG. 11 is a pictorial schematic diagram of an exemplary multiple wind turbine farm embodiment.

FIG. 10 is a pictorial schematic diagram of an exemplary wind turbine farm 402. Wind farm 402 may include one or more computers 400 for local control of one or more of a plurality of wind turbines 100 making up wind farm 402. Control system 500 of each wind turbine 100 within wind farm 402 is communicatively coupled to a network, such as a wired or wireless network. Moreover, one or more computers 400 are communicatively coupled to the network. Computer 400 is configured to control and/or monitor, at a central location, each wind turbine 100 by communicating and/or programmatically directing each control system 500. Further, as shown in FIG. 11, a central server 404 is communicatively coupled to a plurality of computers 400 to facilitate monitoring and controlling a plurality of wind farms 402.

During operation, signals are transmitted via the network from computer 400 to control system 500. Control system 500, in response, adjusts operation of wind turbine 100. The adjustment is in real-time or near real-time. As used herein, real-time refers to outcomes occurring at a substantially short period alter a change in the inputs affecting the outcome, for example, computational calculations. The period may be an amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome. Additionally, events occurring in real-time occur without substantial intentional delay. In contrast, as used herein, near real-time refers to outcomes occurring with some delay after a change in the inputs affecting the outcome. The delay may be intentional, such as due to a timer, or may be unintentional, such as due to latency within a network. Thus, in one embodiment, sensor data is analyzed to determine whether operating characteristics of wind turbine 100 are necessary. In the exemplary embodiment, control system 500, upon receiving the sensor data signal from data acquisition device 302, analyzes the data and determines whether an adjustment is necessary. In an alternative embodiment, control system 500 sends the sensor data signal to computer 400. In another alternative embodiment, each computer 400 further transmits sensor data to a central server 404, which collects and/or analyzes sensor data from a plurality of wind farms 402.

Figure 12:
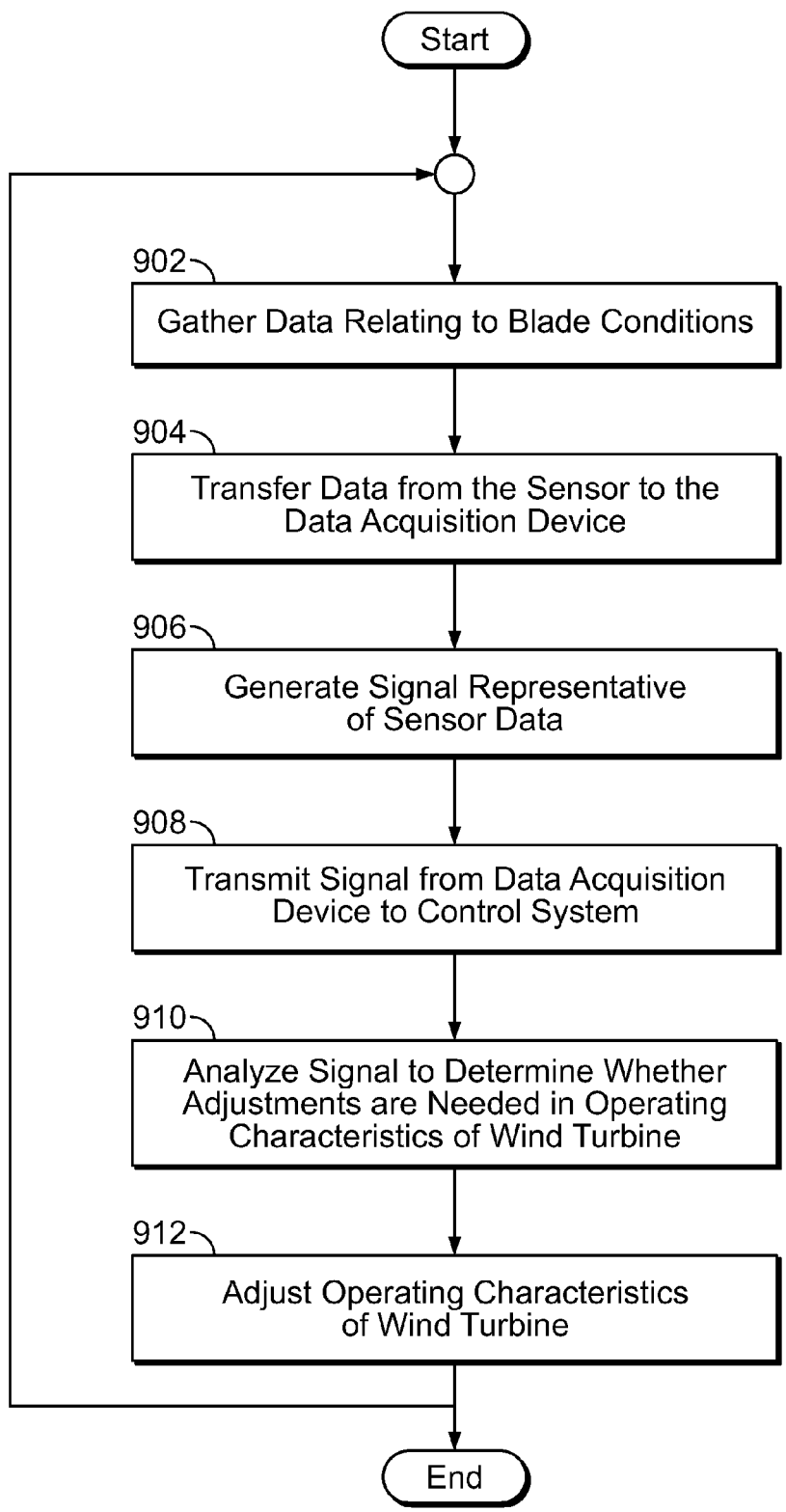
FIG. 12 is a flow chart illustrating an exemplary method of transmitting data from a rotating wind turbine.

FIG. 12 is a flow chart illustrating an exemplary method 900 of monitoring operating data from wind turbine 100 (shown in FIG. 1) having a plurality of turbine blades 112 (shown in FIG. 1). Each blade 112 includes one or more sensor elements 300 operatively coupled to one or more data acquisition devices 302 (both shown in FIG. 7). In the exemplary embodiment, the sensor data facilitates measuring blade acceleration in order to calculate loads present in blades 112. In alternative embodiments, the sensor data includes at least one of anomalous stress, strain, temperature, and/or other conditions of blades 112 is gathered 902 by at least one sensor element 300 coupled to each blade 112 of wind turbine 100. The sensor data is then transferred 904 from sensor element 300 to an associated data acquisition device 302. In one embodiment, data is automatically transferred 904 to data acquisition device 302. In an alternative embodiment, data acquisition device 302 periodically polls sensor element 300 for sensor data and sensor element 300 transfers 904 sensor data in response to the polling.

In the exemplary embodiment, data acquisition device 302 then generates 906 a signal representative of the sensor data and transmits 908 the signal to control system 500. In one embodiment, the signal is transmitted 908 to control system 500 using radio frequency (RF) transmission such as, but not limited to, over a wireless network. In alternative embodiments, data acquisition device 302 transmits 908 the signal to control system using any RF transmission techniques that enable functionality of the systems and methods described herein. In another alternative embodiment, the signal is transmitted 908 to control system 500 using a fiber optic connection between data acquisition device 302 and control system 500. In a further alternative embodiment, the signal is transmitted 908 to control system 500 using a heavily lightning suppressed metallic wire between data acquisition device 302 and control system 500. In yet another alternative embodiment, control system 500 transmits the signal to computer 400.

In the exemplary embodiment, the signal representing the sensor data is analyzed 910 to determine whether adjustments are needed in the operating characteristics of wind turbine 100. Specifically, in one embodiment, the blade acceleration data is analyzed to determine loads present in blades 112. In the exemplary embodiment, control system 500 analyzes 910 the signal for a wind turbine 100. In an alternative embodiment, computer 400 analyzes 910 the signal for a plurality of wind turbines 100 making up a wind farm 402. In a further alternative embodiment, central server 404 analyzes 910 the signal for a plurality of wind farms 402. The loads on blades 112 can be modified by adjusting 912 the operating characteristics of wind turbine 100.

In an alternative embodiment, the sensor data and/or the signal representing the sensor data is stored by at least one of control system 500, computer 400, and/or central server 404. The stored data can be analyzed 910 to determine when maintenance is necessary on an individual wind turbine 100, a plurality of wind turbines 100 of a wind farm 402, and/or a plurality of wind turbines 100 spread across a plurality of wind farms 402.

In another alternative embodiment, a finite element analysis (FEA) is performed by at least one of control system 500, computer 400, and/or central server 404. The FEA uses at least one of the sensor data and/or the representative signal transmitted by data acquisition device 302 to facilitate determining the position of sensors 300 in order to detect large changes in strain within blades 112. After positioning sensors 300 according to the FEA output, strain within blades 112 is observed by collecting and analyzing sensor data as described above. If a particular sensor 300 provides a strain reading that is different from an expected strain reading during operation of wind turbine 100, control system 500, computer 400, and/or central server 404 raises an alert to a user and/or maintenance personnel.

It will thus be appreciated that various aspects of the present invention provide sensors and data acquisition devices that transmit data from a rotating blade to a control system without using an internal power source. A plurality of sensors are positioned on the blade depending on a modeling analysis. For example, stress distributions can be mapped in real-time and recorded. Alternatively, stress and/or acceleration measurements can be analyzed to determine whether adjustments to the operating characteristics of the wind turbine are necessary to reduce and/or balance blade loads.

While the invention has been described in terms of various specific embodiments, those skilled in the art will recognize that the invention can be practiced with modification within the spirit and scope of the claims.

What is claimed is:

1. A method for monitoring operating parameters of a blade of a wind turbine having at least one strain sensor and a data acquisition device operatively coupled to the at least one strain sensor, said method comprising:
    supplying power to the data acquisition device, the data acquisition device configured to receive the power generated at the blade by at least one of a vibration of the blade and a pressure change across the blade;
    supplying power to the at least one strain sensor from the data acquisition device;
    sensing, by the at least one strain sensor, strain data associated with the blade;
    transferring the strain data from the at least one strain sensor to the data acquisition device;
    converting, by the data acquisition device, the strain data to digital strain data;
    transmitting, through radio frequency (RF) transmission, the digital strain data from the data acquisition device to an RFID reader;
    storing the transferred strain data in a computer; and
    analyzing the stored strain data to determine the strain on the blade.

2. A method in accordance with claim 1 wherein the at least one strain sensor and data acquisition device are coupled to an outer surface of the blade.

3. A method in accordance with claim 1 wherein the blade is coupled to a hub of a tower supporting the wind turbine, and further comprising analyzing the stored strain data to make one of real-time adjustments and near real-time adjustments in operating characteristics of the wind turbine.

4. A method in accordance with claim 1, further comprising determining from the analyzed strain data when maintenance is necessary.

5. A method in accordance with claim 1, wherein analyzing the stored strain data includes performing a finite element analysis of the stored strain data.

6. A method in accordance with claim 1, wherein said blade comprises at least one temperature sensor and a second data acquisition device coupled to the at least one temperature sensor, and further comprising:
    transferring temperature data from the at least one temperature sensor to the second acquisition device, and transmitting, through radio frequency (RF) transmission, the temperature data from the second data acquisition device to the RFID reader.

7. A method in accordance with claim 1, wherein a radio frequency identification (RFID) tag includes the at least one strain sensor and the first data acquisition device.

8. A method in accordance with claim 7, wherein the radio frequency identification (RFID) tag includes a passive RFID tag.

9. A method in accordance with claim 1, further comprising storing the sensed strain data by the at least one strain sensor and periodically polling the at least one strain sensor by the data acquisition unit.

10. A blade having an outer surface, an inner surface, and an axis between the outer surface and the inner surface and configured for mounting to a rotor, said blade comprising:
    at least one strain sensor operatively coupled to the outer surface; and,
    a data acquisition device operatively coupled to said at least one strain sensor and to the outer surface, said at least one strain sensor is configured to transfer analog strain data to said data acquisition device, said data acquisition device is powered by energy generated at the outer surface and comprising elements to supply power to said at least one strain sensor and to convert the analog strain data into digital strain data, generate a signal representative of the digital strain data and transmit, through radio frequency (RF) transmission, the signal to an RFID reader.

11. A blade in accordance with claim 10 wherein said blade is coupled to a rotor of a wind turbine.

12. A blade in accordance with claim 10 wherein said at least one strain sensor comprises a first strain sensor and a second strain sensor which are spaced from each other and coupled along a line that extends substantially parallel to the longitudinal axis.

13. A blade in accordance with claim 10, wherein a radio frequency identification (RFID) tag includes the at least one strain sensor and the data acquisition device.

14. A blade in accordance with claim 13, wherein the radio frequency identification (RFID) tag includes a passive RFID tag.

15. A blade in accordance with claim 10, further comprising at least one temperature sensor configured to sense temperature data associated with the blade and a second data acquisition device coupled to the at least one temperature sensor, said second data acquisition device configured to transmit, through radio frequency (RF) transmission, a signal representative of the temperature data to the RFID reader.

* * * * *